US007503063B1

(12) United States Patent
Mishra et al.

(10) Patent No.: US 7,503,063 B1
(45) Date of Patent: Mar. 10, 2009

(54) CONTAINER LEVEL ACCESS CONTROL MECHANISM

(75) Inventors: Anshuman Mishra, Westminster, CO (US); Kumar Subramanya, Louisville, CO (US); Brandon E. Taylor, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 826 days.

(21) Appl. No.: 11/095,431

(22) Filed: Mar. 30, 2005

(51) Int. Cl.
*G06F 17/30* (2006.01)
(52) U.S. Cl. .................................... 726/2; 726/5; 726/6
(58) Field of Classification Search .................... 726/2, 726/5, 6
See application file for complete search history.

(56) References Cited

OTHER PUBLICATIONS

Solaris Containers, Wikipedia, printed 2008.*
Event-based blackboard architecture for multi-agent systems Dong, J.; Chen, S.; Jeng, J.-J.; Information Technology: Coding and Computing, 2005. ITCC 2005. International Conference on vol. 2, Apr. 4-6, 2005 pp. 379-384 vol. 2.*
A purpose-oriented access control model for object-based systems Yasuda, M.; Tachikawa, T.; Takizawa, M.; Object-Oriented Real-Time Distributed Computing, 1998. (ISORC 98) Proceedings. 1998 First International Symposium on Apr. 20-22, 1998 pp. 146-147.*
An object-oriented database system Jasmine: implementation, application, and extension Ishikawa, H.; Yamane, Y.; Izumida, Y.; Kawato, N.; Knowledge and Data Engineering, IEEE Transactions on vol. 8, Issue 2, Apr. 1996 pp. 285-304.*

* cited by examiner

*Primary Examiner*—David Y Jung
(74) *Attorney, Agent, or Firm*—Bobby K. Truong; Hickman Palermo Truong & Becker LLP (57) ABSTRACT

An access control mechanism that implements access control at a container level is disclosed. In one implementation, the access control mechanism provides one or more access control services, and registers these services with a container. Once registered, the access control services are exposed to other applications in the container, and those applications can invoke the services to have the access control mechanism implement access control on their behalf. The access control mechanism implements access control for all applications within the container; thus, the applications do not need to implement their own access control mechanisms. In addition, the access control mechanism is not an operating system component. Thus, by relying on the access control mechanism for access control functionality, the applications are not relying on any operating system component. As a result, the applications, the container, and the access control mechanism can be ported to and run on other operating systems/platforms.

22 Claims, 3 Drawing Sheets

CONTAINER LEVEL ACCESS CONTROL MECHANISM

BACKGROUND

A large scale computer program provides a large number of functionalities that can be invoked by users and other entities (e.g. other programs). Some of these functionalities (e.g. functionalities that allow a user to set certain fundamental operating parameters of the program) may have significant impact on the overall operation and performance of the program, while other functionalities may have little or no impact. Because some of the functionalities may give rise to serious consequences, it is desirable to limit access to those and perhaps other functionalities to ensure that only the proper users have access to them. For this reason, most, if not all, large scale programs implement some type of access control mechanism.

Some large scale programs implement access control at the component level. More specifically, a large scale program may comprise a plurality of components, each of which may provide one or more functionalities. Access control logic may be coded into some or all of these components to enable them to control and limit access to the functionalities that they provide. An advantage of this component-level approach is that it is versatile. Because each component can implement its own access control logic, that logic can be customized to fit the needs of each individual component. A drawback of this approach, however, is that it can require significant amounts of code to be added to each component, which in turn, can significantly increase the cost of developing each component. In addition, it can lead to large amounts of redundant code.

Access control may also be implemented at the operating system level. Some operating systems provide access control modules that can be invoked by program components (e.g. the components of a large scale program) that run on top of those operating systems. Using the access control modules, an administrator can specify certain access control rules and policies. Then, at runtime, the components can invoke the access control modules of the operating system to have those modules enforce the rules and policies to implement access control on behalf of the components. This approach is advantageous in that it relieves the components of having to implement their own access control mechanisms. However, it is disadvantageous in that it renders the components operating system/platform dependent. Because of this dependency, the components, and hence, the large scale program, cannot be ported to and run on other operating systems/platforms.

As the above discussion shows, the current approaches to implementing access control in large scale programs have significant drawbacks. Consequently, an improved approach is needed.

SUMMARY

In accordance with one embodiment of the present invention, there is provided an access control mechanism that implements access control at a container level. As used herein, the term container refers broadly to any program that contains and hosts other applications. Each application within the container may provide zero or more functionalities. In one embodiment, the access control mechanism is implemented as one of the applications within the container.

In one embodiment, the access control mechanism provides one or more access control services, and it registers these services with the container. Once it does so, the access control services are exposed to the other applications in the container, and those applications are able to invoke the services to have the access control mechanism implement access control on their behalf. In one embodiment, the access control mechanism implements access control for all of the applications in the container; thus, the applications do not need to implement their own access control mechanisms.

As noted above, the access control mechanism, in one embodiment, is implemented as an application within the container. Hence, it is not an operating system component. Thus, by relying on the access control mechanism for access control functionality, the applications in the container are not relying on any operating system component. This in turn means that the applications are not operating system/platform dependent. As a result, the applications, the container, and the access control mechanism can be ported to and run on other operating systems/platforms (i.e. they are platform independent). As this discussion shows, this embodiment of the present invention achieves the advantages of the prior approaches without suffering the accompanying drawbacks.

In one embodiment, the access control mechanism operates as follows. During startup, the access control mechanism registers the access control services that it provides with the container in which the access control mechanism is contained. This registration process exposes the access control services, and enables other applications within the container to see and to invoke those services.

At some point during regular operation, an application within the container receives a request to invoke a functionality that the application provides. Before allowing this functionality to be invoked, the application first determines whether the entity (whether it be a user or a program) trying to invoke the functionality has sufficient access privilege to do so. In one embodiment, the application makes this determination by enlisting the services of the access control mechanism. More specifically, the application sends an invocation request to the access control mechanism to obtain therefrom a determination on whether this entity has sufficient access privilege to invoke this functionality. The invocation request invokes one or more of the access control services provided by the access control mechanism, and may include a set of invocation parameters. In one embodiment, the set of invocation parameters may comprise a role and one or more privileges. The role represents the role currently held by the entity that is invoking the functionality, and the one or more privileges represent the privilege(s) needed to invoke the functionality.

The invocation request is received by the access control mechanism. In response, the access control mechanism determines, based upon the invocation parameters and a set of access control information, whether the entity has sufficient access privilege. In one embodiment, the access control mechanism makes this determination by checking the access control information to determine whether the role specified in the invocation parameters has all of the privileges specified in the invocation parameters. In one embodiment, if the specified role has all of the specified privileges, then the entity has sufficient access privilege to invoke the functionality. Otherwise, the entity does not have sufficient access privilege. After this determination is made, the access control mechanism sends a response to the application indicating whether the entity has sufficient access privilege. The application then acts in accordance with this response to either allow or deny access to the functionality. In this manner, the access control mechanism implements access control for the application. The access control mechanism can implement access control for other applications in the container in the same way. Thus, the access control mechanism acts as a centralized, container level access control mechanism for all of the applications in the container.

DETAILED DESCRIPTION OF EMBODIMENT(S)

Container and Applications

Figure 1:
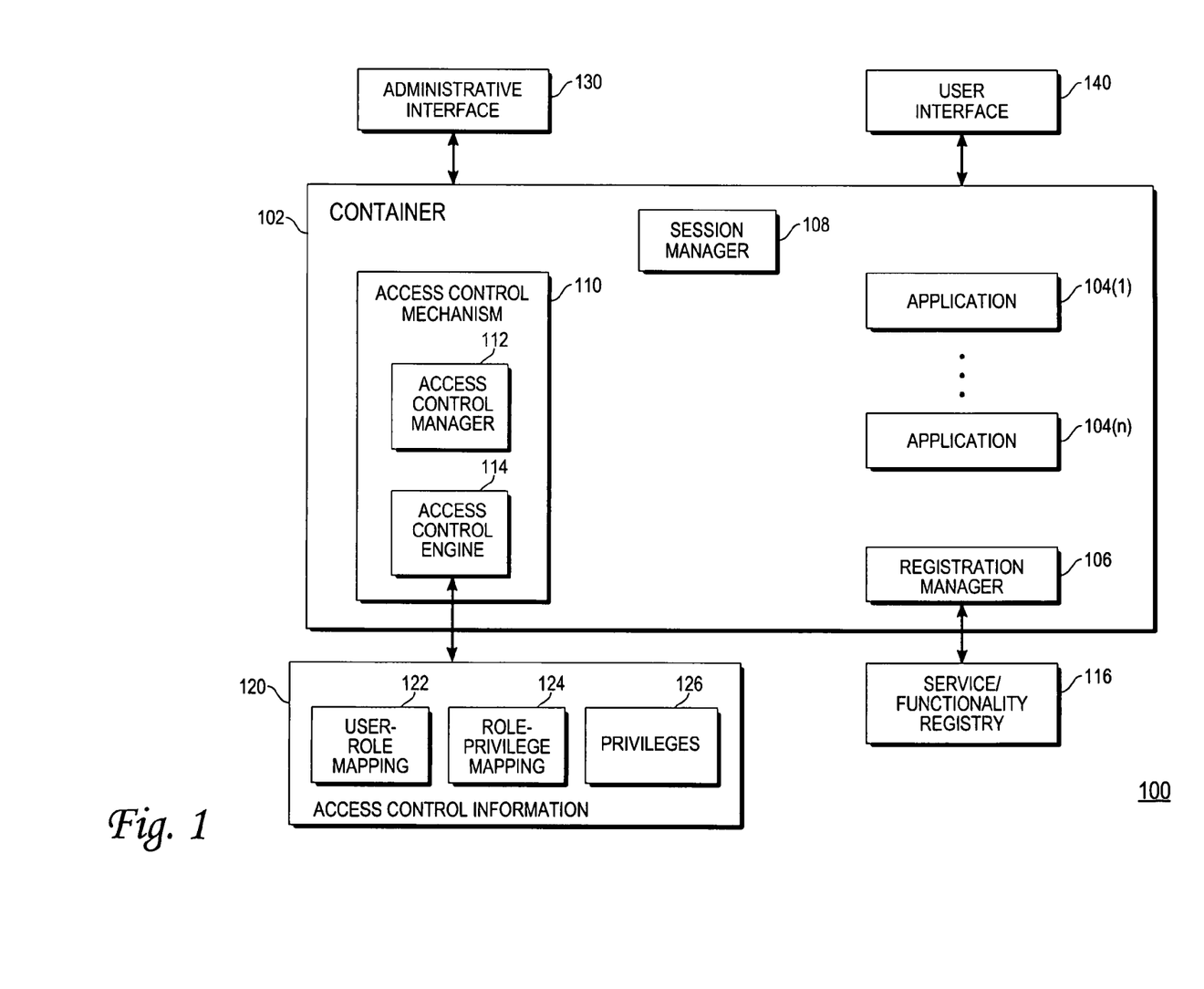
FIG. 1 is a functional block diagram of a system in which one embodiment of the present invention may be implemented.

With reference to FIG. 1, there is shown a functional block diagram of a system in which one embodiment of the present invention may be implemented. As shown, the system 100 comprises a container 102. As used herein, the term container refers broadly to any program that contains and hosts one or more applications 104. A container 102 allows applications 104 to be "plugged in" to the container. Once plugged in, an application 104 can be accessed through the container 102 so that the container 102 acts as the front end host for the application 104. Examples of a container 102 include but are certainly not limited to web servers and web application servers.

In one embodiment, applications 104 are plugged in to the container 102 via a registration process. More specifically, the container 102 comprises a registration manager 106, and the applications 104 interact with this registration manager 106 to register the functionalities that they provide. Once these functionalities are registered, they are exposed to other applications 104 in the container 102 as well as to entities (e.g. users and programs) external to the container 102. These functionalities may thereafter be invoked directly by other applications 104 in the container 102. They may also be invoked by external entities by going through the container 102.

When an application 104 registers a functionality with the registration manager 106, it provides a set of information pertinent to that functionality. In one embodiment, the functionalities provided by the applications 104 take the form of methods that can be invoked. In such an embodiment, the information pertinent to a functionality (i.e. a method) may include the name of the method, the name of the object class that implements the method, a specification of what, if any, parameter(s) may or need to be included in an invocation of the method, a description of the method, etc. This and other information may be provided to the registration manager 106. In response, the registration manager 106 stores the information into a registry 116, and this registry 116 may thereafter be consulted to determine what functionalities are provided by the applications 104 in the container 102, and how those functionalities can be invoked. In this manner, the functionalities are exposed.

Each application 104 may provide and register zero or more functionalities. Some or all of these functionalities may be access controlled. A functionality is access controlled if its invocation requires an invoking entity (e.g. user, program, etc.) to have one or more access privileges. In one embodiment, it is up to the application 104 that provides a functionality to know whether that functionality is access controlled. If a functionality is access controlled, it is up to the application 104 to know what privilege or privileges are needed to invoke that functionality. Knowledge of the functionality-privilege(s) relationship may be programmed into the application 104. For example, the application 104(1) may be hard-coded such that it knows that in order to invoke the method "foo", an invoking entity needs to have privilege "X". Knowledge of the functionality-privilege(s) relationship may also be imparted via a set of configuration information. For example, the configuration information may specify that in order to invoke the method "foo", the privilege "X" is required. The application 104(1) reads the configuration information to learn this functionality-privilege(s) relationship. The application 104 may gain knowledge of the functionality-privilege(s) relationship in these and other ways.

In one embodiment, while the application 104 is responsible for knowing which, if any, privileges are required to invoke a functionality, the application 104 is not responsible for determining whether an invoking entity actually has the necessary privileges to invoke the functionality. Rather, as will be discussed further below, the application 104 enlists the services of the access control mechanism 110 for this determination. Thus, none of the applications 104 need to implement their own access control logic.

Session Manager and Access Control Mechanism

As noted above, one of the functions of the container 102 is to expose the functionalities provided by the applications 104 so that those functionalities can be invoked. In addition to performing this function, the container 102 may also provide some services commonly to all of the applications 104. An example of such a common service is that of session management. As shown in FIG. 1, container 102 comprises a session manager 108. This session manager 108 opens sessions with external entities, manages the session information while the sessions are ongoing, and closes the sessions when the external entities log out. The session manager 108 performs this session management function for all of the applications 104 in the container 102. Thus, the applications 104 do not need to implement their own session management logic.

In one embodiment, another service provided commonly by the container 102 to all of the applications 104 is that of access control. This service is provided by the access control mechanism 110. Given the access control mechanism 110, it is not necessary for the applications 104 within the container 102 to implement their own access control logic. Rather, when they need access control functionality, they call upon the access control mechanism 110. Thus, the access control mechanism 110 provides access control functionality for all of the applications 104 at the container level.

In one embodiment, the access control mechanism 110 comprises an access control manager 112 and an access control engine 114. The access control manager 112 acts as the front end interface of the access control mechanism 110. More specifically, it is the access control manager 112 that interacts with an administrative interface 130 to enable an administrator to manager the access control functionality provided by the access control mechanism 110. It is also the access control manager 112 that interacts with the applications 104 to receive requests for access control functionalities and to provide responses thereto.

The access control engine 114 is the component that carries out the back end access control functions. More particularly, it is the access control engine 114 that manages and maintains a set of access control information 120 used in making access control decisions. It is also the access control engine 114 that determines whether an entity has sufficient access privilege to invoke a functionality. The access control engine 114 is invoked by and interacts with the access control manager 112.

In one embodiment, the access control mechanism 110 is implemented as an application within the container 102. Thus, as with every other application 104, the access control mechanism 110 registers the functionalities that it provides with the registration manager 106. Once registered, these functionalities are exposed, and the applications 104 in the container 102 are able to invoke them. In addition, the functionalities may be invoked by external entities. To clearly distinguish the functionalities provided by the access control mechanism 110 from the functionalities provided by the other applications 104, the functionalities provided by the access control mechanism 110 will hereinafter be referred to as the access control services.

Generally, the access control services may be divided into two groups. The first group, referred to herein as the administrative services, allows an administrator to manage the set of access control information 120 used by the access control mechanism 110 in carrying out access control. The second group, referred to as the query services, may be invoked by the applications 104 to obtain determinations on whether an entity has sufficient access privilege to invoke a functionality.

Before describing these services in greater detail, some additional information will be provided regarding the access control information 120 to facilitate a complete understanding of the present invention. In one embodiment, the access control information 120 is maintained in terms of a hierarchy of users, roles, and privileges. Users are at the top of the hierarchy. A user can have one or more roles. A role may be, for example, "employee", "manager", etc. If a user is a low level employee, then he may have just the "employee" role. If a user is a manager, then he may have both the "manager" and "employee" roles. Each role may have one or more associated privileges. A privilege provides permission to access some information or to perform some function. Different roles may have different privileges. For example, while a "manager" role may have a privilege "X" that allows financial information to be viewed, an "employee" role may not have such a privilege.

Information pertaining to the users, roles, and privileges are stored in data structures 122, 124, and 126. Specifically, data structure 126 stores all of the available privileges. Data structure 124 stores the mapping between roles and privileges. Thus, if the "manager" role has the privileges "X" and "Y", then that would be specified in this data structure 124. Data structure 122 stores the mapping between users and roles. Hence, if a user has the "manager" and "employee" roles, then that would be specified in this data structure 122. For purposes of the present invention, data structures 122, 124, and 126 may be any type of data structure taking on any desired form. In one embodiment, the data structures 122, 124, and 126 take the form of extensible markup language (XML) documents. More specifically, the information contained in data structures 122, 124, 126 is specified using extensible access control markup language (XACML), which is a form of XML. XACML is a well known standard; hence, it need not be described in detail herein. With the above information in mind, the access control services provided by the access control mechanism 110 will now be described in detail.

Administrative Services

In one embodiment, the access control mechanism 110 provides the following administrative services:

createPrivilege—allows a privilege to be created and added to data structure 126;

deletePrivilege—allows a privilege to be removed from data structure 126;

createRole—allows a role to be created and added to data structure 124;

deleteRole—allows a role and its associated privileges, if any, to be removed from data structure 124;

createrUser—allows a user to be created and added to data structure 122;

deleteUser—allows a user and its associated roles, if any, to be removed from data structure 122;

addPrivilegeToRole—allows a privilege to be added to/associated with a role in data structure 124;

deletePrivilegeFromRole—allows a privilege to be removed from/de-associated with a role in data structure 124;

addRoleToUser—allows a role to be added to/associated with a user in data structure 122; and deleteRoleFromUser—allows a role to be removed from/de-associated with a user in data structure 122.

It should be noted that this list of administrative services is shown for illustrative purposes only. It is not meant to be definitive or exhaustive. Thus, the access control mechanism 110 may provide fewer services, more services, and/or different services.

Using an administrator interface 130, an administrator can invoke these administrative services of the access control mechanism 110 to manage and to maintain the access control information 120 in data structures 122, 124, and 126. By manipulating this information, the administrator can control which functionalities can be invoked by which entities. Because these services can have profound effects on the overall operation of the system 100, these services are access controlled. Thus, only a user having the proper access privileges will be allowed to invoke these services. The access control mechanism 110 checks for these privileges before allowing the administrative services to be invoked.

Query Services

In addition to the administrative services, the access control mechanism 110, in one embodiment, also provides the following query services:

isUserAuthorized; and isRoleAuthorized.

Again, it should be noted that this list of query services is shown for illustrative purposes only. It is not meant to be definitive or exhaustive. Thus, the access control mechanism 110 may provide fewer services, more services, and/or different services.

The query services allow applications 104 to submit requests to the access control mechanism 110 to obtain determinations on whether certain functionalities can be invoked. More specifically, the "isUserAuthorized" service, when invoked, takes in several parameters from an application 104. A first parameter is a set of user information (e.g. user name or ID) that identifies a particular user. The other parameter or parameters are one or more privileges. These privileges represent the privileges that are required in order to invoke a particular functionality provided by an application 104. In response, the "isUserAuthorized" service determines, based upon the access control information 120, whether the specified user has all of the one or more specified privileges.

Similarly, when the "isRoleAuthorized" service is invoked, it takes in a role parameter and one or more privilege parameters from an application 104. The role represents the role currently held by an entity trying to invoke a particular functionality provided by the application 104, and the privileges represent the one or more privileges required to invoke that functionality. In response, the "isRoleAuthorized" service determines, based upon the access control information 120, whether the specified role has all of the one or more specified privileges. With these query services, the applications 104 are able to use the access control mechanism 110 to determine whether to allow functionalities that they provide to be invoked.

Sample Operation

Figure 2:
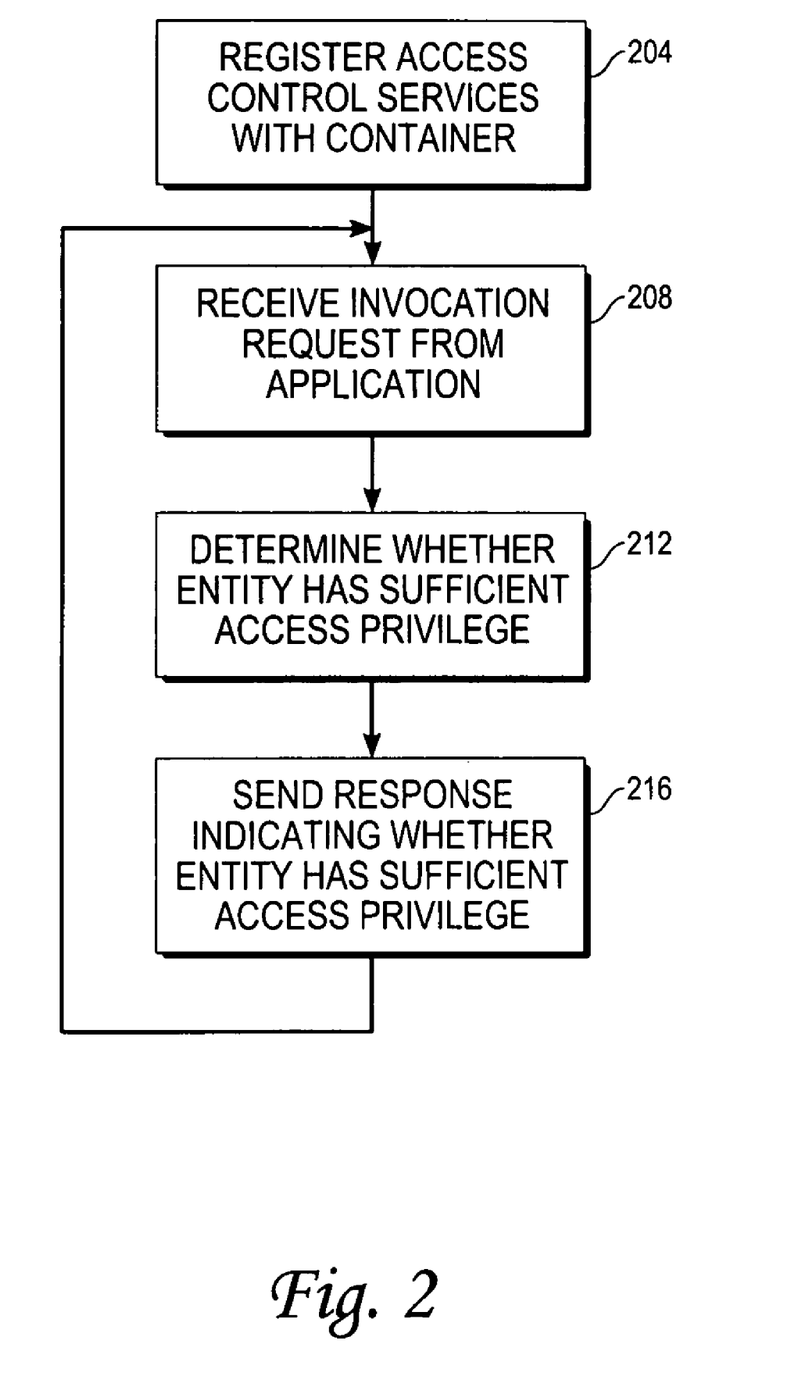
FIG. 2 is an operational flow diagram illustrating the operation of the access control mechanism of FIG. 1, in accordance with one embodiment of the present invention.

With reference to the functional block diagram of FIG. 1 and the operational flow diagram of FIG. 2, a sample operation of the system 100 will now be described. At startup time, each of the applications 104 registers its functionalities with the registration manager 106 of the container 102. Since, in one embodiment, the access control mechanism 110 is implemented as an application within the container 102, the access control mechanism 110 also registers (block 204) its access control services with the registration manager 106. In one embodiment, the access control services are implemented as methods provided by object classes. Thus, in this embodiment, the access control mechanism 110 registers an access control service (i.e. a method) by providing to the registration manager 106 information pertaining to that method. This information may include, for example, the name of the method, the name of the object class that implements the method, a specification of what, if any, parameter(s) may or need to be included in an invocation of the method, a description of the method, etc. In turn, the registration manager 106 stores this information into the registry 116, thereby exposing the method. Once all of the access control services are registered and exposed, they can be invoked by the other applications 104 and by external entities.

At some point, an administrator may log in to the container 102 using the administrator interface 130. When this occurs, the session manager 108 creates a session. As part of the session creation process, the session manager 108 obtains information pertaining to the administrator, such as the name or ID of the administrator, and the role or roles that the administrator is currently holding. This information is associated with the session. After the session is created, the administrator can try to invoke the administrative services of the access control mechanism 110 to configure the access control information 120. When the administrator invokes one of the administrative services, the access control mechanism 110 checks the session information to make sure that this administrator has the necessary privilege(s) to invoke the service. Only if this is answered in the affirmative will the administrator be allowed to invoke the service. For the sake of example, it will be assumed that the administrator has the necessary privilege(s) to access all of the administrative services.

By invoking the administrative services, the administrator can fully configure the access control information 120 used by the access control mechanism 110. This may involve adding privileges, associating privileges with roles, associating roles with users, etc. After all of the access control information 120 is specified, the access control mechanism 110 is ready to process requests from the other applications 104.

At some point, a user logs in to the container 102 using the user interface 140. In response, the session manager 108 creates a session for the user. As part of the session creation process, the session manager 108 obtains information pertaining to the user, such as the name or ID of the user, and the role or roles that the user is currently holding. This information is associated with the session. After the session is created, the user is allowed to try to invoke one or more functionalities provided by the applications 104. For the sake of example, it will be assumed that the user tries to invoke a method "foo" provided by application 104(1).

Upon receiving this method invocation, the application 104(1) determines whether this method is access controlled, and if so, what privilege or privileges are require to invoke it. For the sake of example, it will be assumed that the application 104(1) determines that a privilege "X" is required to invoke method "foo". That being the case, the application 104(1) needs to determine whether the user has this privilege. To make this determination, the application 104(1) invokes one of the query services provided by the access control mechanism 110. For the sake of example, it will be assumed that the application 104(1) chooses to invoke the "isRoleAuthorized" service.

To invoke this service, the application 104(1) assembles an invocation request. From the information in the registry 116 for this service, application 104(1) knows that the name of the method is "isRoleAuthorized". It also knows the name of the object class that implements this method. In addition, the application 104(1) knows the method requires a role and one or more privileges, where the role represents the role that the user is currently holding and the privilege(s) represents the privilege(s) required to invoke a functionality. The application 104(1) obtains the role from the session information. The application 104(1) knows from its previous determination that the privilege required to invoke "foo" is privilege "X". With this information, the application 104(1) assembles an invocation request. The invocation request comprises an invocation of the "isRoleAuthorized" method on a particular object class. The request further comprises the name of the role currently held by the user and the privilege "X" as invocation parameters. Once formed, the invocation request is sent to the access control mechanism 110.

The access control mechanism 110 receives (block 208) the invocation request, and responds by determining (block 212), based upon the access control information 120 and the invocation parameters, whether the user, as defined by his role, has sufficient access privilege. In one embodiment, the access control mechanism 110 makes this determination by taking the role specified in the invocation request, and using it to access the data structure 124. From data structure 124, the access control mechanism 110 determines which privilege(s) that role has. It then compares the privilege(s) the role has with the privilege "X" specified in the request. If the role has all of the privilege(s) specified in request, then the user has sufficient access privilege. Otherwise, the user does not have sufficient access privilege. After making this determination, the access control mechanism 110 sends (block 216) a response to the application 104(1) indicating whether the user has sufficient access privilege. Given the response, the application 104(1) acts accordingly to either allow or deny access to "foo". In this manner, the access control mechanism 110 implements access control for the application 104(1). The access control mechanism 110 can implement access control for the other applications 104 in the container 102 in the same way.

In the above example, the application 104(1) chose to invoke the "isRoleAuthorized" service. The application 104(1) could have chosen the "isUserAuthorized" service instead. In such a case, the invocation parameters would have included a user name or user ID instead of the role. In response to such an invocation, the access control mechanism 110 would have used the user information to access data structure 122 to determine which role or roles are held by the user. Based on those role(s), the access control mechanism 110 would have accessed data structure 124 to determine what privilege(s) those role(s) have. Then, it would have compared those privilege(s) with the privilege "X" specified in the invocation request to determine whether the user has all of the privileges specified in the invocation request. It then would have sent a response to the application 104(1) indicating whether the user has sufficient access privilege.

Hardware Overview

Figure 3:
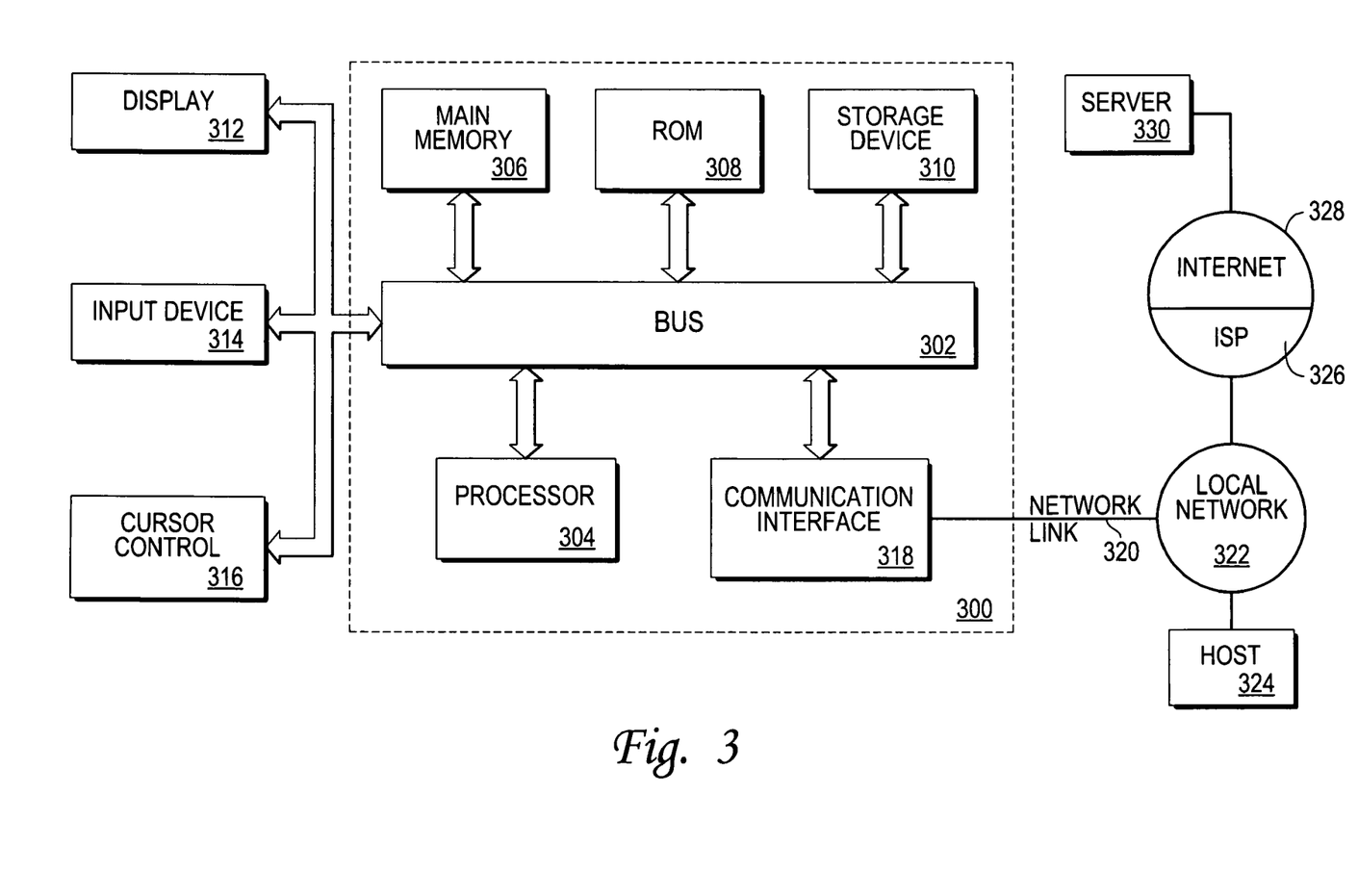
FIG. 3 is a block diagram of a general purpose computer system in which one embodiment of the present invention may be implemented.

In one embodiment, the functional components (e.g. container 102, applications 104, registration manager 106, session manager 108, access control mechanism 110, interfaces 130, 140, etc.) shown in FIG. 1 are implemented as one or more sets of instructions executed on one or more computer systems. FIG. 3 is a block diagram of a sample computer system 300 on which one or more of the functional components may be implemented. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may also be a medium (e.g. air) that enables signals to be capacitively exchanged between one or more of the components. Bus 302 may further be a network connection that connects one or more of the components. Overall, any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. In this instance, the bus 302 would be the medium (such as air) that enables this capacitive communication to take place. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method implemented by an access control mechanism, comprising:
   registering a set of one or more access control services provided by the access control mechanism with a container to enable applications within the container to invoke the set of access control services;
   receiving a first invocation request from a first application within the container, the first invocation request invoking at least one of the access control services to obtain a determination on whether a first entity has sufficient access privilege to invoke a functionality provided by the first application, the first invocation request comprising a first set of invocation parameters;
   determining, based upon the first set of invocation parameters and a set of access control information, whether the first entity has sufficient access privilege; and
   sending a response to the first application indicating whether the first entity has sufficient access privilege.

2. The method of claim 1, further comprising:
   receiving a second invocation request from a second application within the container, the second invocation request invoking at least one of the access control services to obtain a determination on whether a second entity has sufficient access privilege to invoke a functionality provided by the second application, the second invocation request comprising a second set of invocation parameters;
   determining, based upon the second set of invocation parameters and the set of access control information, whether the second entity has sufficient access privilege; and
   sending a response to the second application indicating whether the second entity has sufficient access privilege.

3. The method of claim 1, wherein the access control mechanism is implemented as an application within the container.

4. The method of claim 1, wherein the access control mechanism is not a component of an operating system.

5. The method of claim 1, wherein the access control mechanism is not a component of the first application.

6. The method of claim 1, further comprising:
   receiving an administrative request from an administrator, the administrative request invoking at least one of the access control services to update one or more items of information in the access control information;
   determining whether the administrator has sufficient access privilege to update the access control information; and
   in response to a determination that the administrator has sufficient access privilege to update the access control information, updating the access control information in accordance with the administrative request.

7. The method of claim 1, wherein the first set of invocation parameters comprises a role held by the first entity and a set of one or more specified privileges, and wherein determining whether the first entity has sufficient access privilege comprises:
   determining, based upon the access control information, a set of one or more associated privileges that have been associated with the role; and
   comparing the set of associated privileges with the set of specified privileges to determine whether the set of associated privileges includes all of the privileges in the set of specified privileges.

8. The method of claim 1, wherein the first set of invocation parameters comprises information identifying the first entity, and a set of one or more specified privileges, and wherein determining whether the first entity has sufficient access privilege comprises:
   determining, based upon the access control information, a set of one or more associated privileges that have been associated with the first entity; and
   comparing the set of associated privileges with the set of specified privileges to determine whether the set of associated privileges includes all of the privileges in the set of specified privileges.

9. The method of claim 8, wherein determining the set of associated privileges comprises:
   determining, based upon the access control information, a set of one or more roles associated with the first entity; and determining, based upon the access control information, for each role in the set of roles, a set of one or more privileges associated with that role.

10. A machine readable storage medium comprising instructions which, when executed by one or more processors, cause the one or more processors to give rise to an access control mechanism wherein the access control mechanism performs the following operations:
- register a set of one or more access control services provided by the access control mechanism with a container to enable applications within the container to invoke the set of access control services;
- receive a first invocation request from a first application within the container, the first invocation request invoking at least one of the access control services to obtain a determination on whether a first entity has sufficient access privilege to invoke a functionality provided by the first application, the first invocation request comprising a first set of invocation parameters;
- determine, based upon the first set of invocation parameters and a set of access control information, whether the first entity has sufficient access privilege; and
- send a response to the first application indicating whether the first entity has sufficient access privilege.

11. The machine readable storage medium of claim 10, wherein the access control mechanism further performs the following operations:
- receive a second invocation request from a second application within the container, the second invocation request invoking at least one of the access control services to obtain a determination on whether a second entity has sufficient access privilege to invoke a functionality provided by the second application, the second invocation request comprising a second set of invocation parameters;
- determine, based upon the second set of invocation parameters and the set of access control information, whether the second entity has sufficient access privilege; and
- send a response to the second application indicating whether the second entity has sufficient access privilege.

12. The machine readable storage medium of claim 10, wherein the access control mechanism is implemented as an application within the container.

13. The machine readable storage medium of claim 10, wherein the access control mechanism is not a component of an operating system.

14. The machine readable storage medium of claim 10, wherein the access control mechanism is not a component of the first application.

15. The machine readable storage medium of claim 10, wherein the access control mechanism further performs the following operations:
- receive an administrative request from an administrator, the administrative request invoking at least one of the access control services to update one or more items of information in the access control information;
- determine whether the administrator has sufficient access privilege to update the access control information; and
- update, in response to a determination that the administrator has sufficient access privilege to update the access control information, the access control information in accordance with the administrative request.

16. The machine readable storage medium of claim 10, wherein the first set of invocation parameters comprises a role held by the first entity and a set of one or more specified privileges, and wherein the operation to determine whether the first entity has sufficient access privilege comprises the following operations:
- determine, based upon the access control information, a set of one or more associated privileges that have been associated with the role; and
- compare the set of associated privileges with the set of specified privileges to determine whether the set of associated privileges includes all of the privileges in the set of specified privileges.

17. The machine readable storage medium of claim 10, wherein the first set of invocation parameters comprises information identifying the first entity, and a set of one or more specified privileges, and wherein the operation to determine whether the first entity has sufficient access privilege comprises the following operations:
- determine, based upon the access control information, a set of one or more associated privileges that have been associated with the first entity; and
- compare the set of associated privileges with the set of specified privileges to determine whether the set of associated privileges includes all of the privileges in the set of specified privileges.

18. The machine readable storage medium of claim 17, wherein the operation to determine the set of associated privileges comprises the following operations:
- determine, based upon the access control information, a set of one or more roles associated with the first entity; and
- determine, based upon the access control information, for each role in the set of roles, a set of one or more privileges associated with that role.

19. A computer program product embodied on one or more machine readable storage media, wherein the computer program product, when executed by one or processors, causes the one or more processors to give rise to:
- a container;
- an application contained within the container; and
- an access control mechanism;
- wherein the access control mechanism performs the operations of:
  - registering a set of one or more access control services provided by the access control mechanism with the container to enable the application within the container to invoke the set of access control services;
  - receiving an invocation request from the application, the invocation request invoking at least one of the access control services to obtain a determination on whether an entity has sufficient access privilege to invoke a functionality provided by the application, the invocation request comprising a set of invocation parameters;
  - determining, based upon the set of invocation parameters and a set of access control information, whether the entity has sufficient access privilege; and
  - sending a response to the application indicating whether the entity has sufficient access privilege.

20. The computer program product of claim 19, wherein the access control mechanism is an application contained within the container.

21. The computer program product of claim 19, wherein the access control mechanism is not a component of an operating system.

22. The computer program product of claim 19, wherein the access control mechanism is not a component of the application.

* * * * *